(12) United States Patent
Kuratomi et al.

(10) Patent No.: US 12,416,978 B2
(45) Date of Patent: Sep. 16, 2025

(54) DISPLACEMENT METER CONFIGURED TO MEASURE A DISPLACEMENT OF A MEASUREMENT TARGET OBJECT AND ARTICLE MANUFACTURING METHOD

(71) Applicant: CANON KABUSHIKI KAISHA, Tokyo (JP)

(72) Inventors: Kazuyuki Kuratomi, Tochigi (JP); Takayuki Uozumi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 609 days.

(21) Appl. No.: 17/726,161

(22) Filed: Apr. 21, 2022

(65) Prior Publication Data
US 2022/0349706 A1     Nov. 3, 2022

(30) Foreign Application Priority Data

Apr. 28, 2021   (JP) ................. 2021-076745

(51) Int. Cl.
*G06F 3/03*     (2006.01)
*G01B 11/04*     (2006.01)
(Continued)

(52) U.S. Cl.
CPC .......... *G06F 3/0304* (2013.01); *G01B 11/043* (2013.01); *G01P 3/36* (2013.01); *G01P 13/045* (2013.01)

(58) Field of Classification Search
CPC ..... G01B 11/043; G01B 11/02; G01B 11/026; G01B 11/14; G01P 13/045; G01P 3/36; G06F 3/0304; G01C 3/00–3/32
See application file for complete search history.

(56) References Cited

U.S. PATENT DOCUMENTS 5,128,961 A * 7/1992 Ueda .................. G01S 5/22
                                          708/250
2002/0179819 A1* 12/2002 Nahum ............... G01B 11/02
                                          250/208.1
(Continued)

FOREIGN PATENT DOCUMENTS

EP            0347912 A2 * 12/1989 ........... G01B 11/162
JP            H0450708 A      2/1992
(Continued)

*Primary Examiner* — Michael P LaPage
(74) *Attorney, Agent, or Firm* — Canon U.S.A., Inc. IP Division

(57) ABSTRACT

A displacement meter configured to measure a displacement of a measurement target object includes an illumination assembly configured to illuminate the measurement target object, a photoelectric conversion element array configured to detect reflected light from the measurement target object, and a calculation circuit configured to calculate an amount of the displacement of the measurement target object by using a cross-correlation function of a plurality of images acquired at different timings by the photoelectric conversion element array. The calculation circuit limits a detection range, where the calculation circuit performs processing for detecting a position indicating a peak of the cross-correlation function, to a part of an entire range of the cross-correlation function, detects the position indicating the peak in the limited detection range, and calculates the amount of the displacement based on the detected position indicating the peak.

11 Claims, 11 Drawing Sheets

(51) Int. Cl.
    *G01P 3/36*       (2006.01)
    *G01P 13/04*      (2006.01)

(56) References Cited

U.S. PATENT DOCUMENTS

| | | | |
|---|---|---|---|
| 2007/0216894 A1* | 9/2007 | Garcia | G06F 3/017 |
| | | | 356/4.01 |
| 2014/0044460 A1* | 2/2014 | Kudo | G03G 15/5054 |
| | | | 399/301 |
| 2014/0064034 A1* | 3/2014 | Zhang | G01S 11/14 |
| | | | 367/127 |
| 2018/0189975 A1* | 7/2018 | Inada | G06T 1/00 |

FOREIGN PATENT DOCUMENTS

| | | | | |
|---|---|---|---|---|
| JP | 2014-56111 | * | 3/2014 | G03G 21/00 |
| JP | 2014056111 A | | 3/2014 | |

* cited by examiner

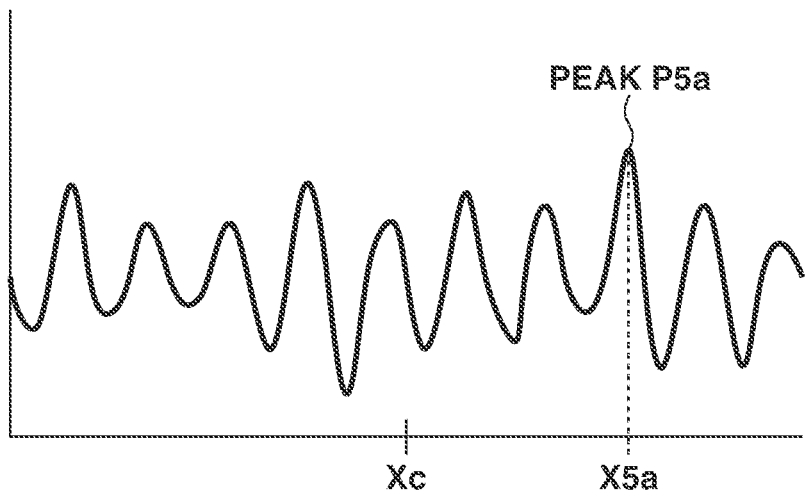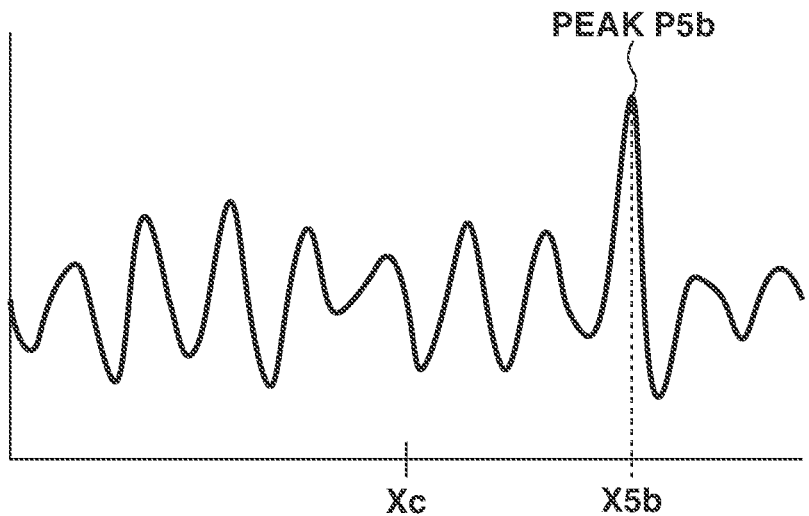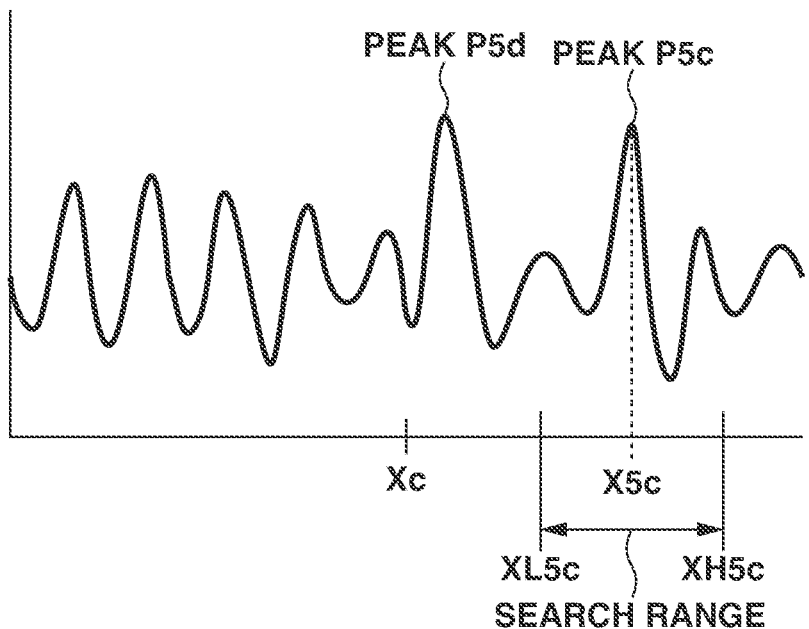

DISPLACEMENT METER CONFIGURED TO MEASURE A DISPLACEMENT OF A MEASUREMENT TARGET OBJECT AND ARTICLE MANUFACTURING METHOD

BACKGROUND

Technical Field

One disclosed aspect of the embodiments relates to a displacement meter and an article manufacturing method.

Description of the Related Art

Japanese Patent Application Laid-Open No. 4-050708 discusses a speckle length measurement meter that emits a laser beam to the surface of a moving target object, detects a speckle pattern appearing on the surface, and measures the amount of displacement of the target object.

The speckle length measurement meter has a configuration in which an image sensor acquires a speckle pattern on an observation surface to which a laser beam is emitted. The speckle length measurement meter calculates the cross-correlation function of reference data acquired at a reference position and current data acquired after the acquisition of the reference data. The speckle length measurement meter then searches for a peak position in the obtained cross-correlation function, and calculates the amount of movement of the object based on the peak position. If it is determined that the degree of correlation in the cross-correlation function decreases, the current data is set as new reference data. This enables length measurement even if the moving distance of the object increases.

However, in a case where the moving speed of the object is fast, the speckle pattern also changes fast. Thus, in the obtained cross-correlation function, a false peak having a high degree of correlation can occur in addition to a true peak that is supposed to be detected. If the false peak has a higher degree of correlation than that of the true peak, the amount of displacement cannot be calculated correctly.

SUMMARY

According to an aspect of the embodiments, a displacement meter configured to measure a displacement of a measurement target object includes an illumination assembly, a photoelectric conversion element array, and a calculation circuit. The illumination assembly is configured to illuminate the measurement target object. The photoelectric conversion element array is configured to detect reflected light from the measurement target object. The calculation circuit is configured to calculate an amount of the displacement of the measurement target object by using a cross-correlation function of a plurality of images acquired at different timings by the photoelectric conversion element array. The calculation circuit limits a detection range. The calculation circuit performs processing for detecting a position indicating a peak of the cross-correlation function, to a part of an entire range of the cross-correlation function, detects the position indicating the peak in the limited detection range, and calculates the amount of the displacement based on the detected position indicating the peak.

Further features of the disclosure will become apparent from the following description of exemplary embodiments with reference to the attached drawings.

BRIEF DESCRIPTION OF THE DRAWINGS

FIGS. 10A to 10C are diagrams each illustrating a cross-correlation function according to the third exemplary embodiment.

DESCRIPTION OF THE EMBODIMENTS

Exemplary embodiments will be described in detail below based on the attached drawings. In the following, the term "unit" may be used to refer to a circuit, a subsystem, a module, a functional block, a logic device, a physical device, a processor, or hardware elements. It may include mechanical, optical, or electrical components, or any combination of them. It may include active (e.g., transistors) or passive (e.g., capacitors) components. It may include one or more programmable processors, such as a central processing unit (CPU) or a microprocessor, that are configured to execute instructions or programs stored in one or more memory devices to perform specified operations. It may include logic elements such as AND-OR, and NOT elements implemented by transistor circuits or any other switching circuits. Typical combinational logic functions may be implemented by switching circuits such as multiplexers (to implement select functions), encoders, and decoders.

Figure 1:
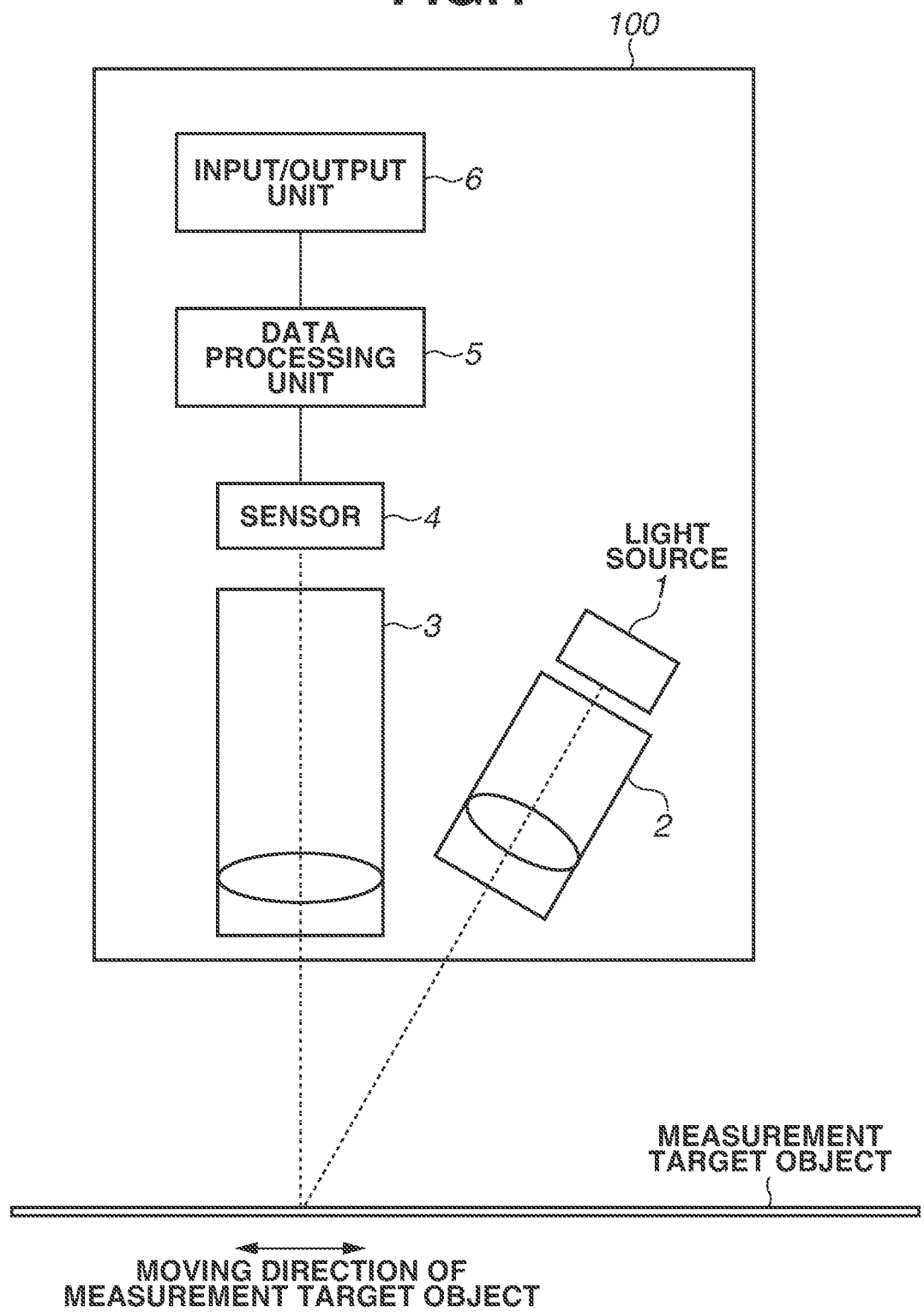
FIG. 1 is a schematic diagram illustrating a non-contact length measurement meter according to a first exemplary embodiment.

FIG. 1 illustrates a schematic configuration of a non-contact length measurement meter (a displacement meter) 100 according to a first exemplary embodiment. As illustrated in FIG. 1, the displacement meter 100 according to the present exemplary embodiment measures, in a non-contact manner, the displacement of a measurement target object that is disposed opposed to the displacement meter 100 and is moving in a direction indicated by a double-headed arrow in FIG. 1.

A light beam emitted from a light source 1 is collected on the measurement target object by an illumination optical assembly (an illumination assembly) 2, and illuminates the measurement target object. An optical assembly is a collection of optical components that are integrated or combined in a structure that is configured to perform a specified optical function. The light source 1 is controlled by a control unit or circuit (not illustrated). The light source 1 is a laser diode, a light-emitting diode (LED), or a halogen lamp. In a case where the laser diode, which is a coherent light source, is selected, an image including speckles is obtained. In a case where the LED or the halogen lamp, which is an incoherent light source, is selected, an image reflecting a pattern on the surface of the measurement target object is obtained.

The illumination optical assembly 2 includes a single lens or a lens group. In a case where the laser diode is used, it is desirable to select the one on the basis that aberration is corrected so that light can be collected as a plane wave. In a case where the LED or the halogen lamp is selected, it is important to select the one in terms of illuminating a light reception area, and aberration is not particularly an issue. The type of the light source 1 can be appropriately selected depending on the size of the area to be illuminated.

A part of the light diffusely reflected by the measurement target object passes through a light reception optical assembly of a light collection member 3 and is collected on a sensor 4. The light collection member 3 includes a single lens or a lens group and can be appropriately selected based on the resolution of the light reception optical assembly.

The sensor 4 includes a photoelectric conversion element array and is for example a charge-coupled device (CCD) image sensor, a complementary metal-oxide-semiconductor (CMOS) image sensor, or a line sensor. In a case where one of the two-dimensional area sensors is selected as the sensor 4, two-dimensional displacement can be detected. In a case where the line sensor is selected, one-dimensional displacement can be detected. The photoelectric conversion element array is a circuit that includes a group of photoelectric conversion elements arranged in a predetermined geometrical pattern such as a linear array, a two-dimensional array, or any suitable pattern.

The magnification of the light reception optical assembly can be determined based on the installation distance between the measurement target object and the light collection member 3, the focal length of the single lens or lens group used in the light collection member 3, and the position of the sensor 4. The conversion length of the pixels, i.e., the resolution is determined as a measurement reference based on the magnification of the light reception optical assembly and the size of each pixel included in the sensor 4.

The light beam that is image-formed on the sensor 4 is photoelectrically converted, and the resulting image data is output to a data processing unit or circuit (a calculation unit or circuit) 5. The data processing unit or circuit 5 includes a processor such as a microcomputer, a field-programmable gate array (FPGA), or a digital signal processor (DSP). The data processing unit or circuit 5 processes the image data output from the sensor 4, and calculates the length measurement amount (the displacement amount) of the measurement target object.

The length measurement amount calculated by the data processing unit 5 is output to an input/output unit 6. The input/output unit 6 transmits the calculated length measurement amount to the outside of the displacement meter 100, as length measurement data. In the case of a wired local area network (LAN), a configuration of the input/output unit 6 corresponds to an Ethernet PHY or a connector. In addition, the input/output unit 6 can be configured using any communication method for communicating with an external device, such as serial communication (e.g., Universal Serial Bus (USB) or Recommended Standard 232C (RS-232C)). The communication may be not only wired but also wireless. The specification may be such that the length measurement value is output as a pulse signal or an analog signal.

The input/output unit 6 is configured to receive an instruction, such as a command, from an external device so that the input/output unit 6 can also start or stop the length measurement or provide a notification about the state of the apparatus, based on the received command.

Figure 2:
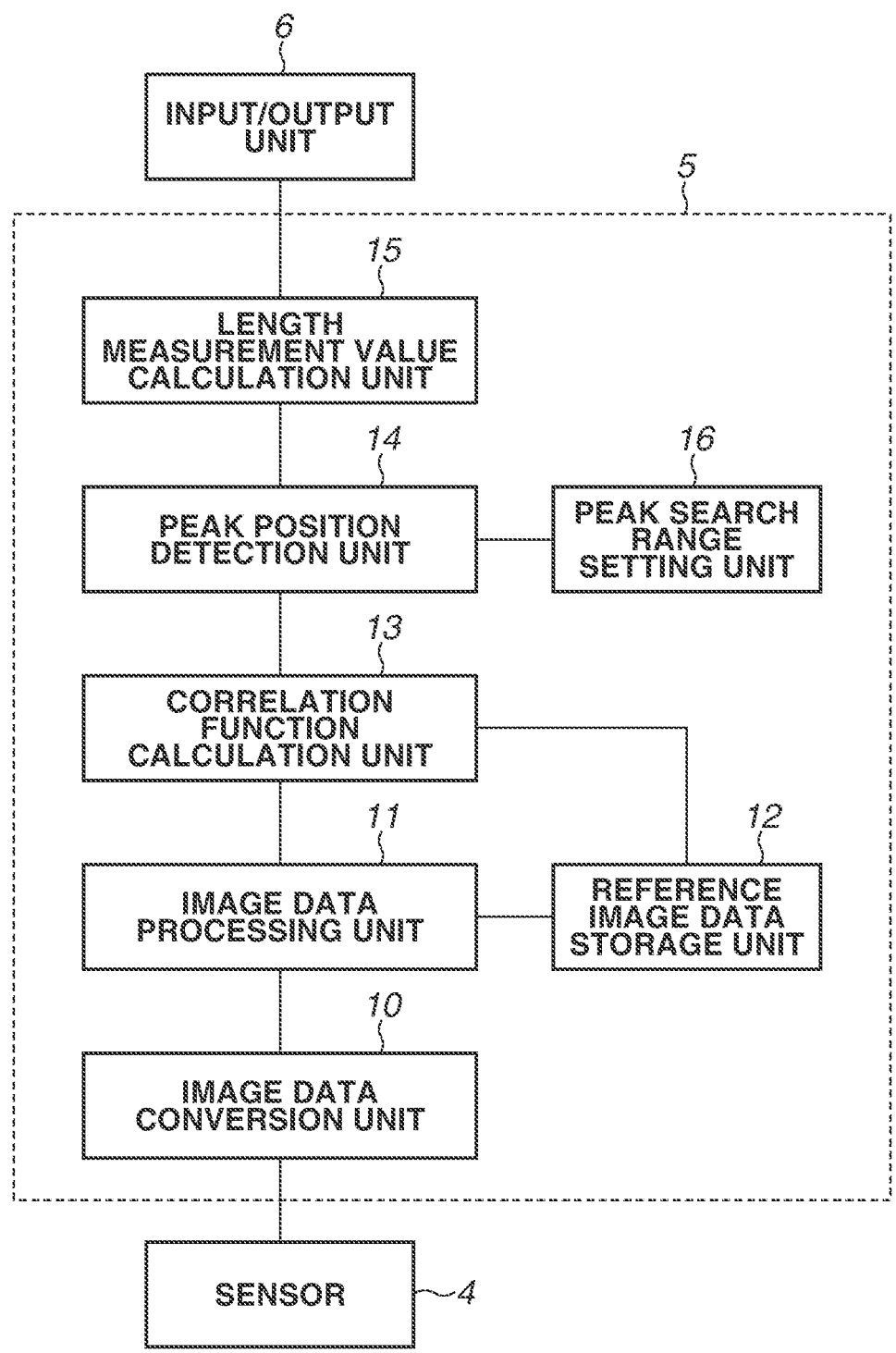
FIG. 2 is a diagram illustrating a configuration of a data processing unit or circuit according to the first exemplary embodiment.

Next, the data processing unit 5 will be described with reference to FIG. 2. FIG. 2 illustrates a configuration of the data processing unit 5. The image data transmitted as an analog signal from the sensor 4 is converted into a digital signal through analog-to-digital (AD) conversion by an image data conversion unit 10. In a case where the image data is output as a digital signal from the sensor 4, the image data conversion unit 10 is not included in the data processing unit 5.

The image data output from the image data conversion unit 10 is subjected to preprocessing for calculating a cross-correlation function, such as offset processing, by an image data processing unit 11. The image data may be subjected to spatial filter processing such as edge enhancement.

A reference image data storage unit 12 stores reference image data that serves as a reference for calculating the length measurement amount. As the calculation principle of the length measurement amount, a cross-correlation function is calculated from two pieces of image data acquired at temporally different timings. Thus, the reference image data storage unit 12 is to store the reference image data in advance.

A correlation function calculation unit 13 calculates the cross-correlation function of the image data output from the image data processing unit 11 and the reference image data output from the reference image data storage unit 12.

A peak position detection unit 14 searches for a pixel position where a correlation value reaches a peak (an extremum) in the calculated cross-correlation function. The cross-correlation function represented in the present exemplary embodiment indicates the correlation value in a case where two pieces of image data acquired at temporally different timings are shifted pixel by pixel.

Based on the pixel position indicating the peak detected by the peak position detection unit 14, a length measurement value calculation unit 15 calculates the amount by which the measurement target object is displaced during the time when the two pieces of image data are acquired, as the length measurement amount (the displacement amount). As described above, the displacement amount of the measurement target object per pixel is determined based on the conversion length (the resolution) determined based on the position of the sensor 4, the focal length of the light collection member 3, and the like. Thus, the displacement amount of the measurement target object can be calculated by multiplying the pixel position of the peak by the conversion length. The calculated length measurement amount is output to the input/output unit 6.

Based on the peak position detected by the peak position detection unit 14, a peak search range setting unit 16 calculates a range (a detection range) where a peak position is to be searched for in the cross-correlation function to be calculated at the next timing. A peak search range is a range obtained by limiting the detection range, where the peak position detection unit 14 performs processing for detecting the position indicating the peak of a cross-correlation function, to a part of the entire range of the cross-correlation function. The peak search range can be set to be changeable. The peak position detection unit 14 detects the position indicating the peak in the limited range, and the length measurement value calculation unit 15 calculates the displacement amount based on the detected position indicating the peak.

Length measurement value calculation processing by the data processing unit 5 will be described in detail with reference to a flowchart in FIG. 3 and cross-correlation functions illustrated in FIGS. 4A to 4C. First, in step S101, when a length measurement start command is received from an external device, the non-contact length measurement meter 100 causes the light source 1 to light up and acquires pieces of image data sequentially obtained using the sensor 4 at a set sampling rate.

In step S102, whether the reference image data is acquired is determined. At the timing when the first image data is acquired, the reference image data for calculating the cross-correlation function is not present. If the reference image data is not acquired (NO in step S102), then in step S104, the acquired image data is stored in the reference image data storage unit 12. In step S119, the length measurement amount is set to 0 (zero).

If the reference image data is acquired (YES in step S102), then in step S103, the cross-correlation function is calculated based on the acquired image data and the reference image data. FIG. 4A illustrates the cross-correlation function that is calculated first. The vertical axis represents the correlation value, and the horizontal axis represents the pixel position. Processing for searching for a peak in this cross-correlation function is to be performed. At the timing when the cross-correlation function is acquired first, the peak search range has not yet been set in step S105.

If it is determined in step S105 that the peak search range is not set (NO in step S105), then in step S107, the peak position detection unit 14 detects the pixel position where the correlation value reaches the maximum peak value, in the entire range of the cross-correlation function. In the cross-correlation function in FIG. 4A, a peak P1$a$ is the maximum peak (the extremum), and the pixel position of the peak P1$a$ is defined as X1$a$.

In the cross-correlation function according to the present exemplary embodiment, the center on the horizontal axis is defined as Xc. If the peak of the cross-correlation function is detected at the center Xc, this means that the image data on the measurement target and the reference image data are not displaced from each other. The moving direction of the measurement target object can also be determined based on whether the side of the center Xc on which the peak is detected is right or left. Assuming that the peak located to the right of the center Xc, such as the peak P1$a$ indicates the movement in the positive direction, if the peak is detected to the left of the center Xc, this indicates that the measurement target object is moving in the negative direction.

Figure 4A:
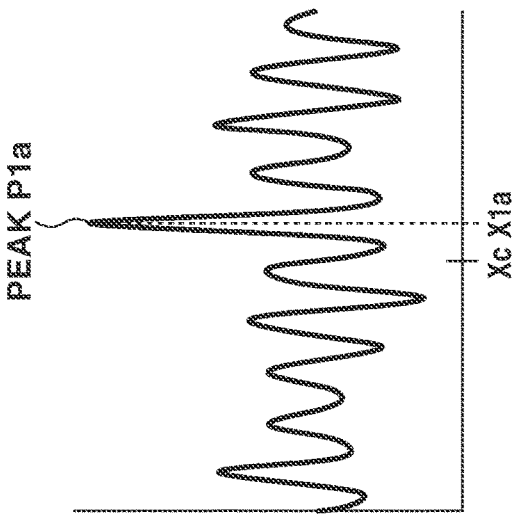
FIGS. 4A to 4C are diagrams each illustrating a cross-correlation function according to the first exemplary embodiment in the case of low speed movement.

Since the pixel position of the peak P1$a$ is X1$a$ in FIG. 4A, in step S108, the length measurement value calculation unit 15 multiplies the number of pixels in a range from the center Xc to the pixel position X1$a$ by the conversion length, thereby calculating the length measurement value.

In this case, since the pixel position X1$a$ is located to the right of the center Xc, the length measurement value is output as a positive value.

In step S109, the input/output unit 6 outputs the calculated length measurement value to the external device, as the length measurement data. In a case where a pulse is output, the pulse is generated based on the length measurement amount, the phase of the pulse is also adjusted based on the moving direction of the measurement target object, and the pulse is output.

In step S110, the peak search range setting unit 16 calculates the range where a peak position is to be searched for in the cross-correlation function to be calculated next. Using the peak position X1$a$ detected in FIG. 4A as a reference, a predetermined position to the left of the peak position X1$a$ is calculated as a start position XL1$b$ where a peak search is to be performed next, and a predetermined position to the right of the peak position X1$a$ is calculated as an end position XH1$b$ of the peak search. In other words, a range including the peak position X1$a$ is calculated as the peak search range. After the peak search range is calculated, the start position XL1$b$ and the end position XH1$b$ are set in the peak position detection unit 14. A procedure to determine the peak search range will be given subsequently.

After the peak search range is calculated and set, then in step S111, the latest image data obtained to calculate the next cross-correlation function is updated as the reference image data.

In step S112, whether to end the length measurement is determined. If a command to end the length measurement is received from the external device (YES in step S112), the acquisition of image data using the sensor 4 is ended, the lighting up of the light source 1 is stopped, and the length measurement is ended. If the length measurement is to be continued (NO in step S112), then in step S101, the next image data is acquired.

Figure 4B:
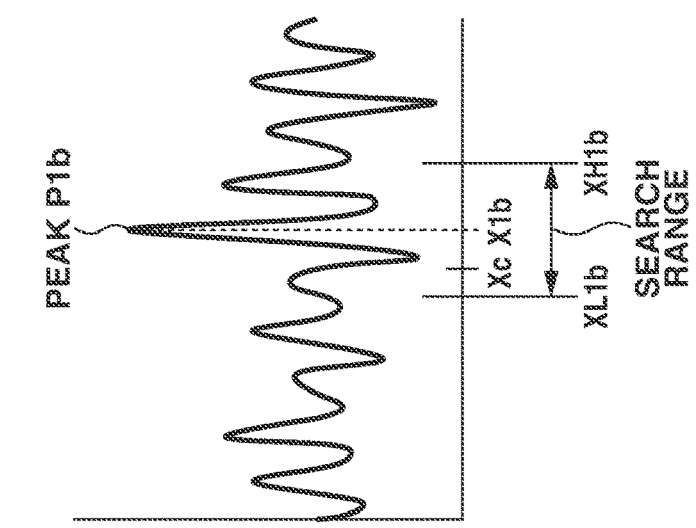

FIG. 4B illustrates the cross-correlation function calculated from the newly acquired image data and the updated reference image data. In a case where the measurement target object is moving at the same speed, the sampling rate for image data acquisition does not change, and thus the peak position in the cross-correlation function occurs almost at the same position.

Since the peak search range is set in step S110, it is determined that the peak search range is set (YES in step S105) and the processing proceeds to step S106. In step S106, the peak position detection unit 14 starts searching for a peak from the start position XL1$b$ of the set peak search range. The search is performed in the peak search range from the start position XL1$b$ to the end position XH1$b$, whereby a pixel position X1$b$ of a peak P1$b$ can be detected as a peak position. The peak position X1$b$ in FIG. 4B is almost the same as the peak position X1$a$ in FIG. 4A.

The length measurement amount is calculated from the detected peak position X1$b$, a search range from a position XL1$c$ to a position XH1$c$ is calculated for the next peak search, and then the positions XL1$c$ and XH1$c$ are set in the peak position detection unit 14. Also at this time, similarly to the above, a range including the peak position X1$b$ is set as the peak search range.

Figure 4C:
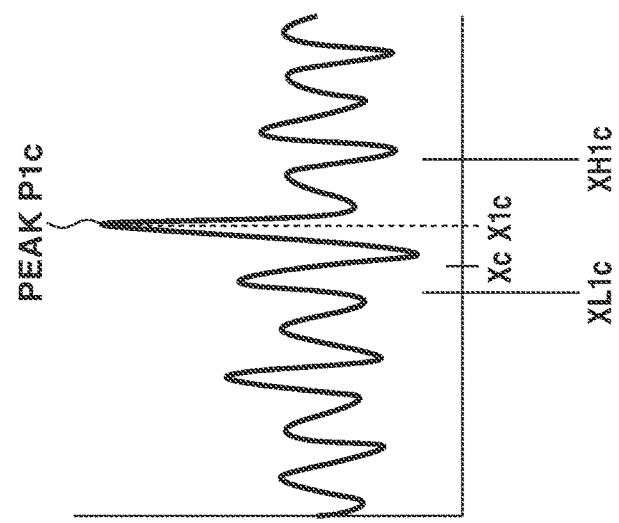

FIG. 4C illustrates the cross-correlation function calculated using the updated image data. The peak search range is set from the position XL1$c$ to the position XH1$c$, and a peak position is searched for in this range. As a result, a pixel position X1$c$ of a peak P1c can be detected as the peak position.

From this point onward, the same length measurement value calculation processing is repeated until an instruction to end the length measurement is given. FIGS. 4A to 4C illustrate how the cross-correlation function changes in a case where the moving speed of the measurement target object is relatively slow. Since the moving speed is slow, the peak positions appear at the positions close to the center Xc. Since the moving speed of the measurement target object is slow, the state of the surface of the measurement target object can be clearly captured in the image data acquired by the sensor 4. Thus, the peak positions in the cross-correlation functions stably occur at the same positions, and thus it is possible to stably measure the length measurement amount.

Figure 5A:
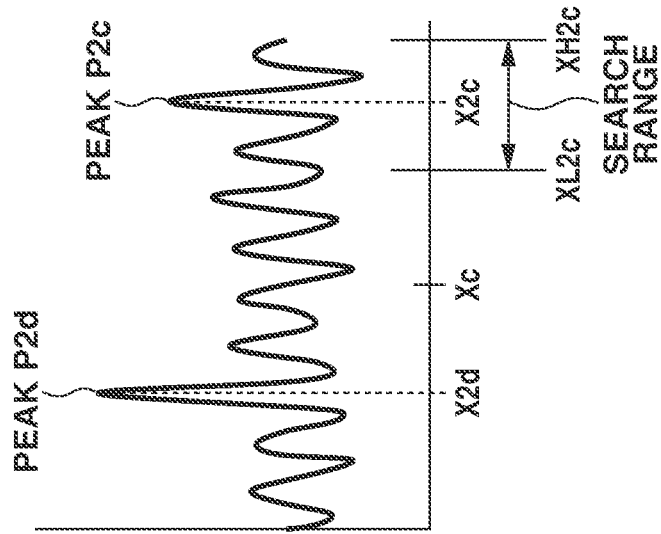
FIGS. 5A to 5C are diagrams each illustrating a cross-correlation function according to the first exemplary embodiment in the case of high speed movement.
Figure 5B:
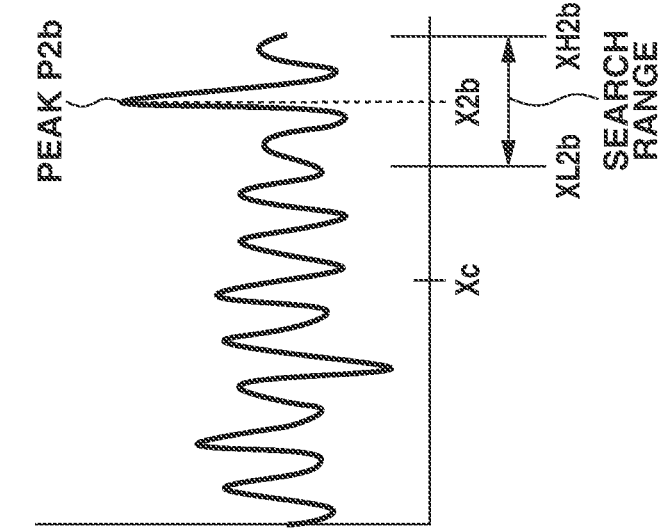
Figure 5C:
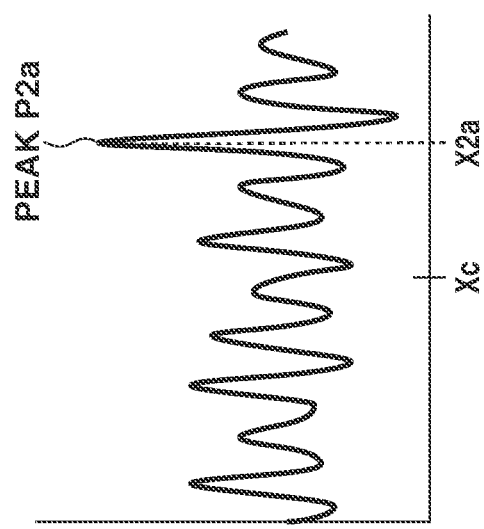

Next, a case where the moving speed of the measurement target object is fast will be described with reference to FIGS. 5A to 5C. Each of FIGS. 5A to 5C illustrates a cross-correlation function. The vertical axis represents the correlation value, and the horizontal axis represents the pixel position. First, after a plurality of images is acquired by measuring the target object multiple times, the peak position detection unit 14 detects the pixel position where the correlation value reaches the maximum peak value in the entire range of the cross-correlation function of the plurality of images. In the cross-correlation function in FIG. 5A, a peak P2a is the maximum peak (the extremum), and the pixel position of the peak P2a is defined as X2a. The peak position X2a is further away from the center Xc than those in the cross-correlation functions in FIGS. 4A to 4C. This indicates that the moving speed of the measurement target object is fast.

Next, using the peak position X2a detected in FIG. 5A as a reference, a predetermined position to the left of the peak position X2a is calculated as a start position XL2b where a peak search is to be performed next, and a predetermined position to the right of the peak position X2a is calculated as an end position XH2b of the peak search. In other words, a range including the peak position X2a is calculated as the peak search range. After the peak search range is calculated, the start position XL2b and the end position XH2b are set in the peak position detection unit 14.

Then, the next measurement is made. The peak position detection unit 14 starts searching for a peak position from the start position XL2b of the set peak search range. The search is performed in the peak search range from the start position XL2b to the end position XH2b, whereby a pixel position X2b of a peak P2b can be detected as the peak position.

The length measurement amount is calculated from the detected peak position X2b, a search range from a position XL2c to a position XH2c is calculated for the next peak search, and then the positions XL2c and XH2c are set in the peak position detection unit 14. Also at this time, similarly to the above, a range including the peak position X2b is set as the peak search range.

FIG. 5C illustrates the cross-correlation function calculated using the updated image data. The peak search range is set from the position XL2c to the position XH2c, and a peak position is searched for in this range. As a result, a pixel position X2c of a peak P1c can be detected as the peak position.

In a case where the measurement target object is moving, the measurement target object moves within the exposure time of the sensor 4, and thus the image data is influenced by blur to no small extent. Thus, if the moving speed of the measurement target object is fast, the image data acquired by the sensor 4 is more influenced by blur and the acquired image data is largely blurred.

As described above, since the image data is acquired in a state where the moving speed of the measurement target object is fast, both the image data and the reference image data are largely blurred. Accordingly, as in the cross-correlation function illustrated in FIG. 5C, the faster the moving speed is, the more likely a false peak P2d is to occur where the correlation value is calculated to be higher than that of the peak P2c that occurs at the actual moving speed. This means that in the process of calculating the cross-correlation function, the correlation is calculated to be higher at the false peak position X2d than at the true peak position X2c under the influence of the blur of the image data. If the length measurement value is calculated using the false peak position X2d, a length measurement amount different from the length measurement amount to be obtained from the actual movement amount of the object is calculated.

In this case, considering the relationship between the sampling rate of the sensor 4 and the moving speed of the object enables approximate estimation of a peak position in the cross-correlation function. Thus, in the present exemplary embodiment, the search range can be set based on information regarding the speed of the measurement target object. The search range can also be set based on information regarding the displacement amount of the measurement target object per sampling period of the photoelectric conversion element array. A peak search is performed in the search range from the position XL2c to the position XH2c set in this way, so that the true peak P2c can be detected. As a result, the true peak position X2c is determined and the length measurement amount is calculated from the true peak position X2c, so that the length measurement amount can be output accurately. If a peak search is performed in the entire range, the false peak P2d is detected and the length measurement amount is calculated incorrectly.

The next peak search range is calculated using the peak P2c detected in the search range as a reference, whereby, even if a false peak occurs in the cross-correlation function that is calculated next, a true peak can be detected.

Next, the calculation of the peak search range will be described in detail. In processing for limiting the peak search range, the search range is to be determined appropriately. If the search range is narrow, a true peak may not be included in the search range. Conversely, if the search range is too wide, a false peak may be included in the search range.

As an example of calculating the peak search range, the peak search range can be calculated from information regarding the speed of the measurement target object tolerated by the non-contact length measurement meter 100, such as acceleration. As long as the maximum acceleration tolerated by the non-contact length measurement meter 100 is determined, the maximum movement amount by which the measurement target object moves during a sampling period for image data acquisition can be calculated. For example, if the movement amount of the measurement target object corresponds to 10 pixels based on the relationship between the maximum acceleration and the sampling period, a range of ±10 pixels or more from a detected peak position may be set as the peak search range. If a search range narrower than ±10 pixels is set as the peak search range, a true peak cannot be detected in the search range, and the length measurement amount can be output incorrectly.

Instead of the calculation based on the acceleration, the moving direction of the measurement target object may be determined to set the search range. As described above, the cross-correlation function according to the present exemplary embodiment indicates the moving direction of the measurement target object based on whether a peak position is located to the right or the left of the center.

In a case where the moving speed of the measurement target object is fast, it can be assumed that the moving direction of the measurement target object is unlikely to reverse within a short sampling period. Thus, the center of the peak search range may be set in the same moving direction as that of a reference peak position. More specifically, after the moving direction of the measurement target object is detected, the search range can be set so that the center of the search range is on the forward side in the moving direction of the measurement target object with respect to the center of the cross-correlation function.

As described above, limiting the peak search range makes it possible to detect a true peak more accurately without detecting a false peak.

In the first exemplary embodiment, the case where the reference image data is updated to the acquired image data each time has been described. In a case where the moving speed of the measurement target object is slow and the reference image data is updated each time, an error that cannot be ignored with respect to the movement amount of the measurement target object occurs in some case. Thus, the reference image data is fixed until the measurement target object moves by a certain amount, so that the cross-correlation functions are calculated using the same reference image data. Thus, it is possible to reduce an error that occurs when the length measurement amount is calculated.

In a case where the reference image data is updated each time, if the measurement target object is moving at the same speed, the peak positions that appear in the cross-correlation functions appear at the same position each time. In contrast, in a case where the reference image data is fixed, even if the measurement target object is moving at the same speed, the peak positions that appear in the cross-correlation functions do not occur at the same position, and the peak positions also move based on the moving speed.

Since the reference image data is updated if the measurement target object moves by a certain amount, the peak position in the cross-correlation function to be calculated next after the update of the reference image moves based on a threshold for updating the reference image data. In other words, in a case where the peak search range is limited, a condition for calculating the peak search range is to be changed between when the reference image data is fixed and when the reference image data is updated.

In a second exemplary embodiment, the setting of the peak search range in a case where the reference image data is fixed and in a case where the reference image data is updated will be described with reference to FIGS. 6 and 7A to 7D. A configuration of a non-contact length measurement meter according to the present exemplary embodiment is similar to the configuration of the non-contact length measurement meter 100 according to the first exemplary embodiment illustrated in FIGS. 1 and 2.

Figure 6:
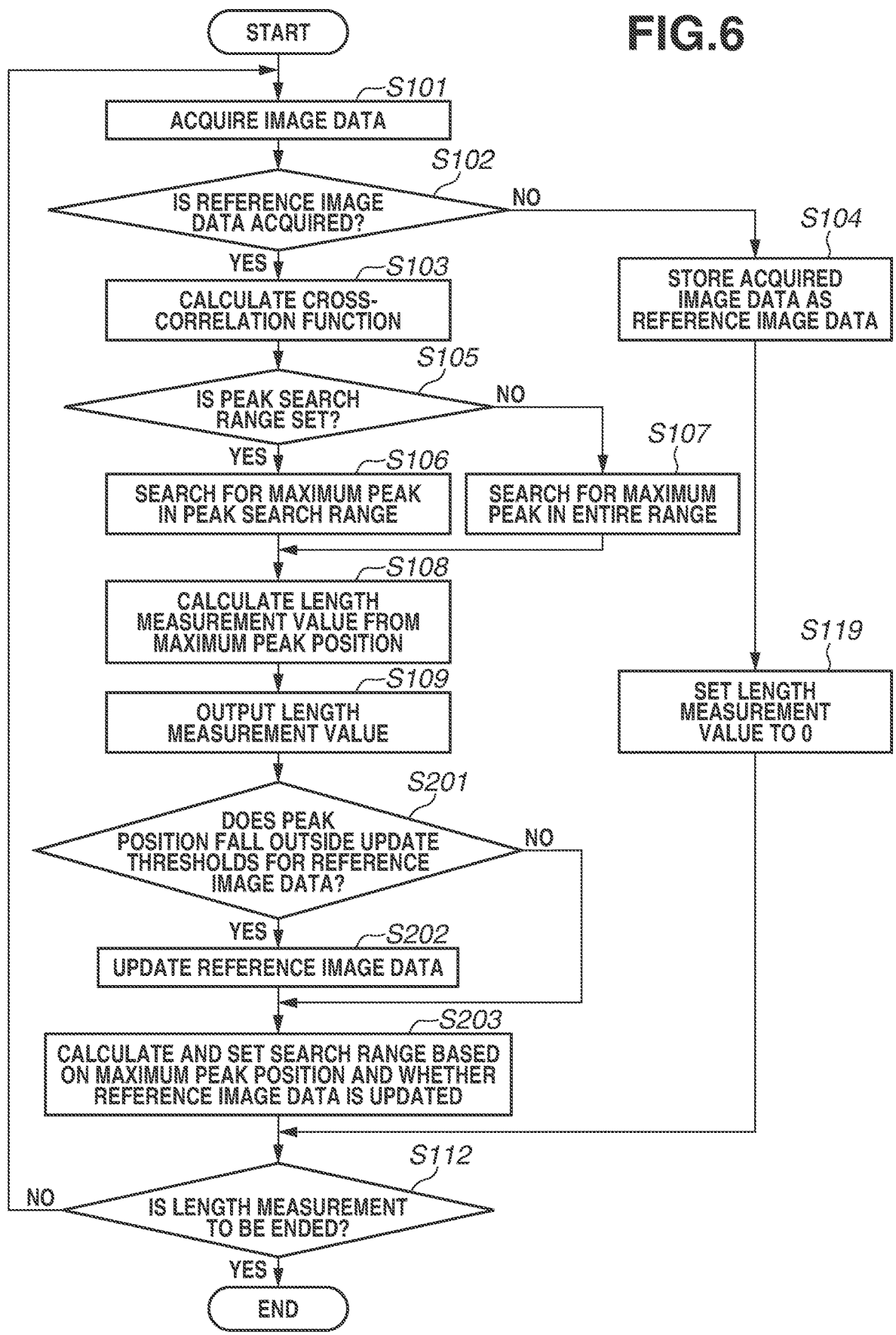
FIG. 6 is a flowchart illustrating a signal processing method according to a second exemplary embodiment.

FIG. 6 illustrates processing for calculating the length measurement amount considering whether the reference image data is updated. Processing of steps S201 to S203 is added to the signal processing flowchart according to the first exemplary embodiment in FIG. 3, in place of the processing of step S110. Processing similar to that in FIG. 3 is designated by the same reference numerals, and redundant description thereof will be appropriately omitted.

Processing from the start of length measurement to the calculation of the length measurement value in step S108 and the output of the calculated length measurement value in step S109 is similar to that in the first exemplary embodiment. In the first exemplary embodiment, after the length measurement value is output, the search range is calculated and set using the maximum peak position as a reference. In the present exemplary embodiment, in step S201, it is determined whether the peak position detected in step S106 or S107 falls outside determination thresholds for updating the reference image data.

Figure 7A:
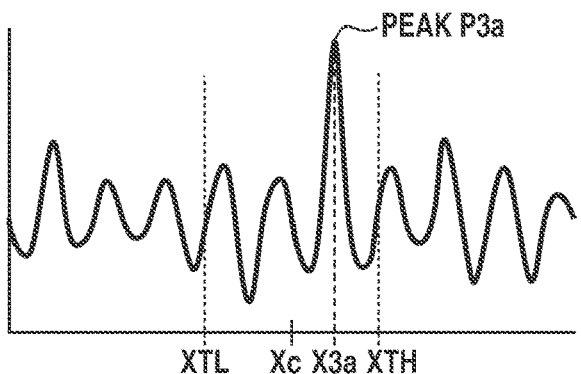
FIGS. 7A to 7D are diagrams each illustrating a cross-correlation function according to the second exemplary embodiment.

FIG. 7A illustrates the cross-correlation function initially calculated in the length measurement value calculation processing according to the present exemplary embodiment. Update thresholds XTL and XTH are used to determine whether to update the reference image data. Whether to update the reference image data is determined based on the moving distance of the measurement target object. However, since the length measurement value is calculated by multiplying the peak position in the cross-correlation function by the above-described conversion length, the numbers of pixels may be used as the update thresholds XTL and XTH. In the present exemplary embodiment, the update thresholds XTL and XTH are represented by the numbers of pixels in the cross-correlation function, and if the peak position falls outside the update thresholds XTL and XTH, the reference image data is to be updated.

In FIG. 7A, a peak P3$a$ is detected in the entire range, and the peak position is X3$a$. At this time, the peak position X3$a$ falls within the update thresholds XTL and XTH. Thus, in step S201, it is determined that the peak position does not fall outside the update thresholds XTL and XTH (NO in step S201). Thus, the update of the reference image data in step S202 is not performed, and the processing proceeds to the calculation of the search range in step S203.

Figure 7B:
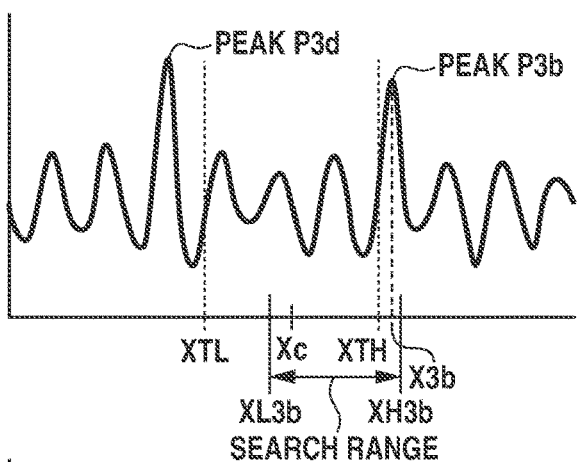

In step S203, the search range is calculated. Using the detected peak position X3$a$ as a reference, a search range from a position XL3$b$ to a position XH3$b$ illustrated in FIG. 7B is calculated. Since the reference image data is not updated, the update of the reference image data is not considered in calculating the search range. After the search range is calculated, the calculated search range is set in the peak position detection unit 14.

In step S112, whether to continue the length measurement is determined. If the length measurement is to be continued (NO in step S112), then in step S101, the next image data is acquired. Subsequently, the cross-correlation function is to be calculated, but since the reference image data is not updated as a result of the determination in step S201, then in step S103, the cross-correlation function is calculated based on the reference image data that is not updated and the acquired latest image data. FIG. 7B illustrates the calculated cross-correlation function.

Next, a peak search is performed, but since the peak search range is set from the position XL3$b$ to the position XH3$b$, then in step S106, a peak P3$b$, which is the maximum peak in this range, is detected and the peak position is X3$b$. Although the maximum peak is a peak P3$d$ in the entire range, the peak P3$d$ is outside the search range and thus is not detected.

In step S108, the length measurement value is calculated. The length measurement value is calculated from the peak position X3$b$, but since the reference image data is not updated, the previously calculated length measurement value is also included. Thus, the previous length measurement value calculated using the peak position X3$a$ is to be subtracted from the length measurement value calculated using the peak position X3$b$. Alternatively, the length measurement value may be calculated based on the difference in the number of pixels between the peak position X3$b$ detected this time and the peak position X3$a$ of the peak P3$a$ detected last time. In step S109, the length measurement value calculated based on the difference is output.

As illustrated in FIG. 7B, in the determination of whether to update the reference image data in step S201, the detected peak position X3$b$ exceeds the update threshold XTH (YES in step S201) and thus the processing proceeds to step S202. In step S202, the reference image data is updated to the latest image data.

Figure 7C:
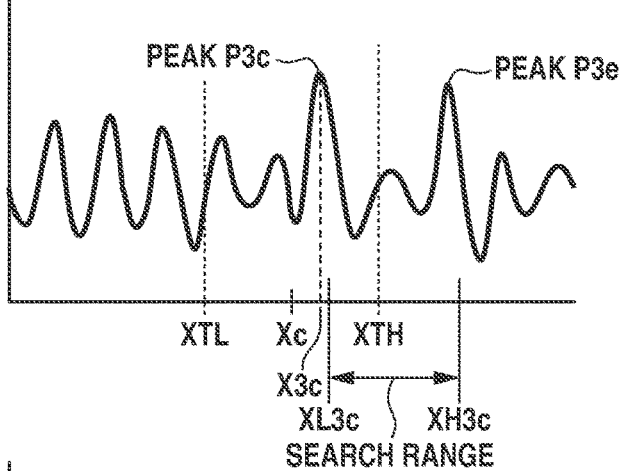

Since the reference image data is updated, the update of the reference image data is to be considered in calculating the search range in step S203. FIG. 7C illustrates a search range XL3c-XH3c in a case where the reference image data is not considered. The search range XL3c-XH3c is calculated using the detected peak position X3b as a reference. However, as a result of updating the reference image data, a true peak P3c that is supposed to be detected is not included in the search range XL3c-XH3c, and thus a false peak P3e is detected.

Figure 7D:
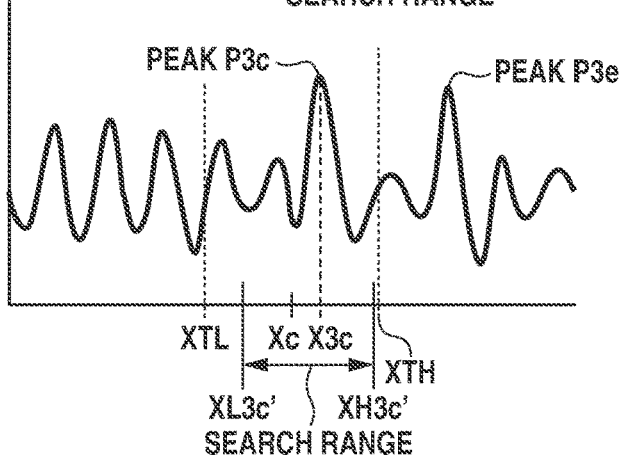

For this reason, in a case where the reference image data is updated, the amount by which a peak position moves is to be considered. In a case where the reference image data is updated, the amount of movement of the peak position is determined based on the update thresholds XTL and XTH. Thus, the search range is to be calculated using the amount of movement of the peak position X3b, which is determined based on the update thresholds XTL and XTH, as a reference. FIG. 7D illustrates a search range XL3c'-XH3c' calculated considering the update of the reference image data. If peak detection is performed in the search range XL3c'-XH3c', the true peak P3c can be detected.

With the above-described processing, it is possible to calculate the peak search range considering whether the reference image data is updated, and detect a true peak more accurately.

In the present exemplary embodiment, the description has been given of the method of, in a case where the reference image data is updated, determining a reference position considering the movement amount of the peak position determined based on the update thresholds XTL and XTH, and calculating the search range from the determined reference position. Alternatively, the search range may be widened considering the amount of movement of the peak position. In this case, since the search range is wide, the search range is to be set so as not to include a false peak therein.

In the first and second exemplary embodiments, the descriptions have been given of the true peak detection processing based on limiting the search range where a peak position is to be searched for in the cross-correlation function, and the calculation processing for specifically setting the search range. In a case where the search range is limited, a true peak is to be used as a reference. If a false peak is used as a reference, the state where a true peak is not included in the search range continues. Thus, a correct length measurement value cannot be calculated. Thus, in a third exemplary embodiment, a technique for selecting a true peak when the search range is limited will be described with reference to a flowchart in FIG. 8 and examples of cross-correlation functions in FIGS. 9A to 9C and 10A to 10C.

Figure 3:
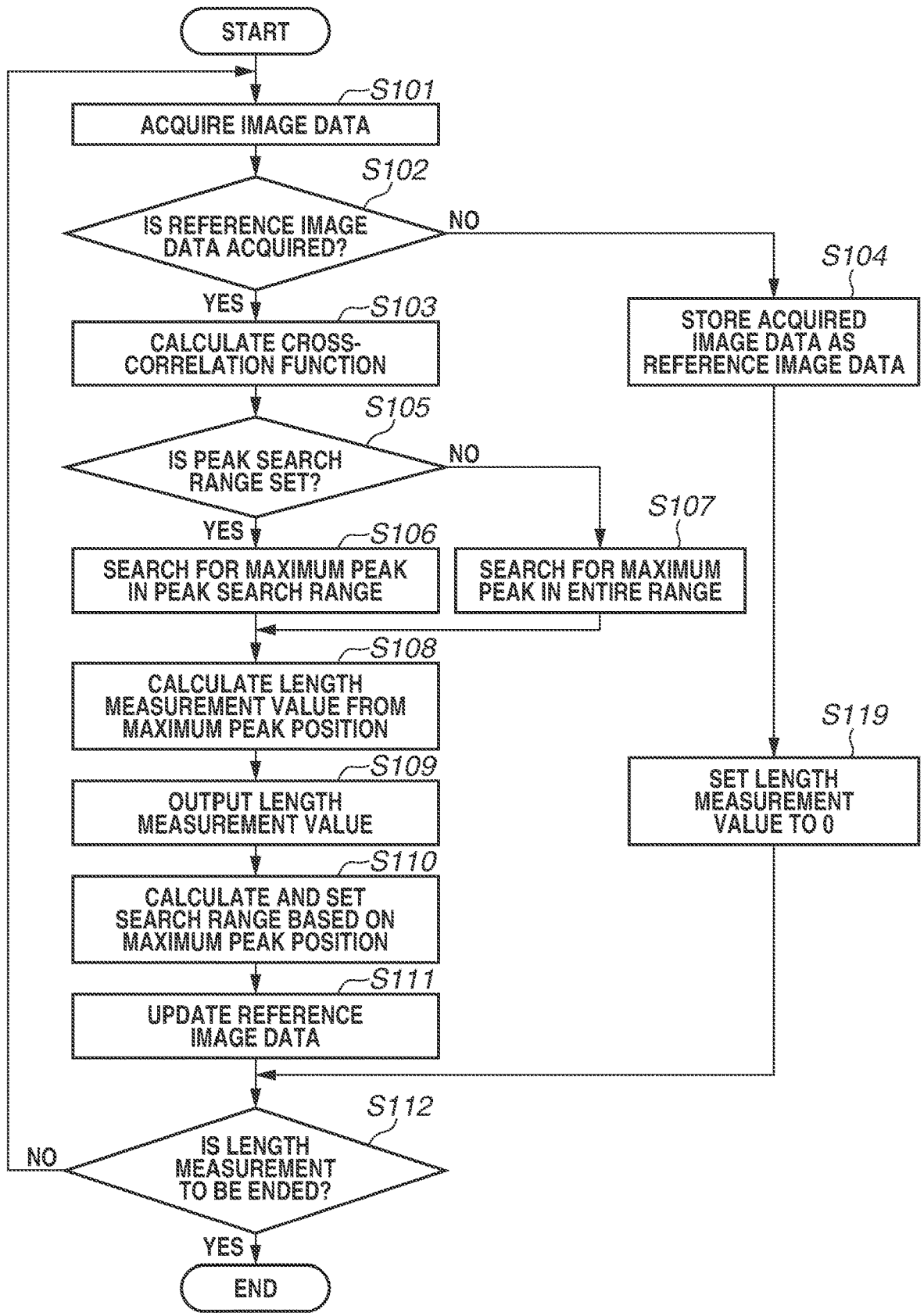
FIG. 3 is a flowchart illustrating a signal processing method according to the first exemplary embodiment.
Figure 8:
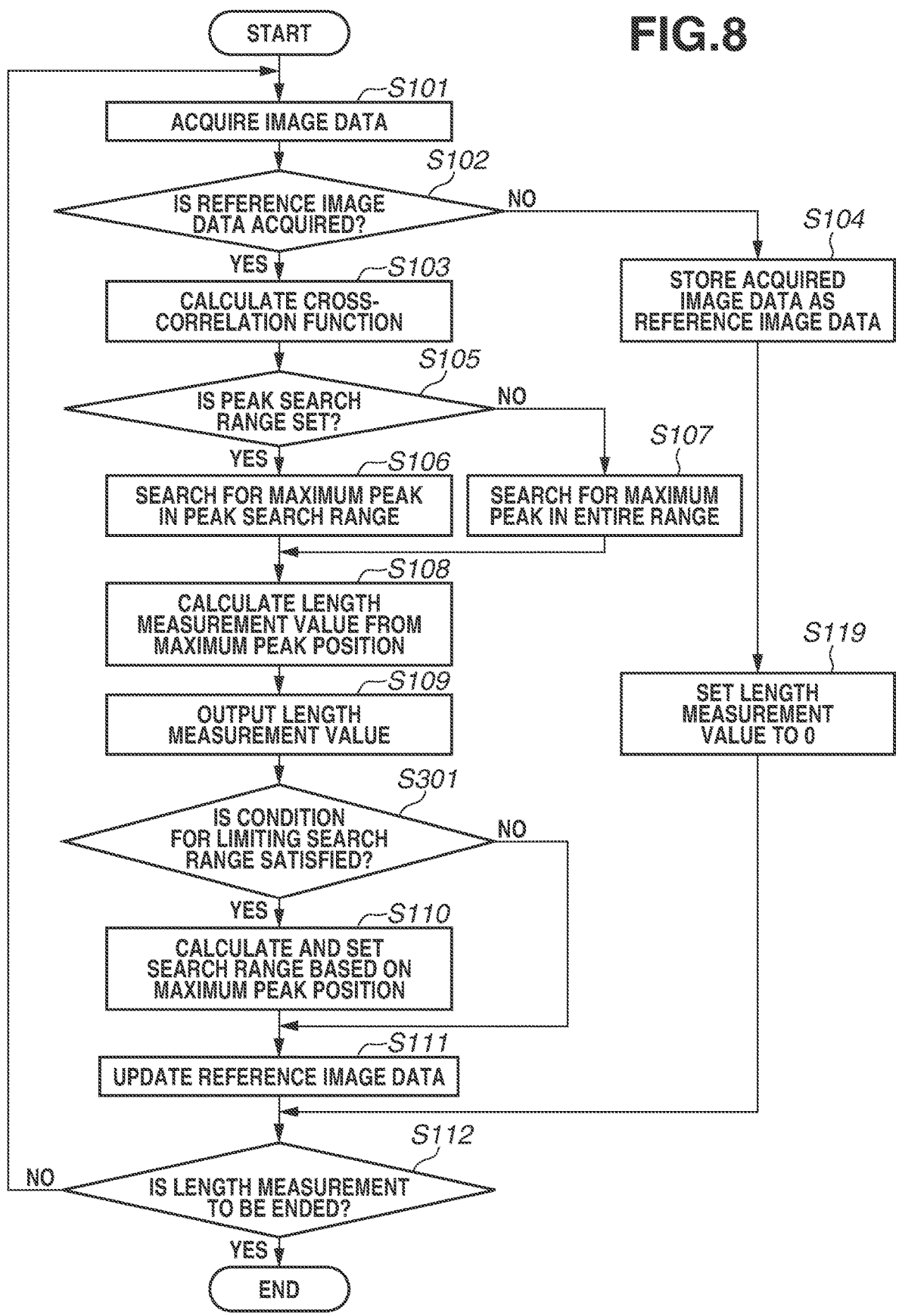
FIG. 8 is a flowchart illustrating a signal processing method according to a third exemplary embodiment.

The flowchart in FIG. 8 is obtained by adding processing of step S301 to the flowchart in FIG. 3 according to the first exemplary embodiment. The description of the processing described in the first and second exemplary embodiments will be appropriately omitted.

Figure 9A:
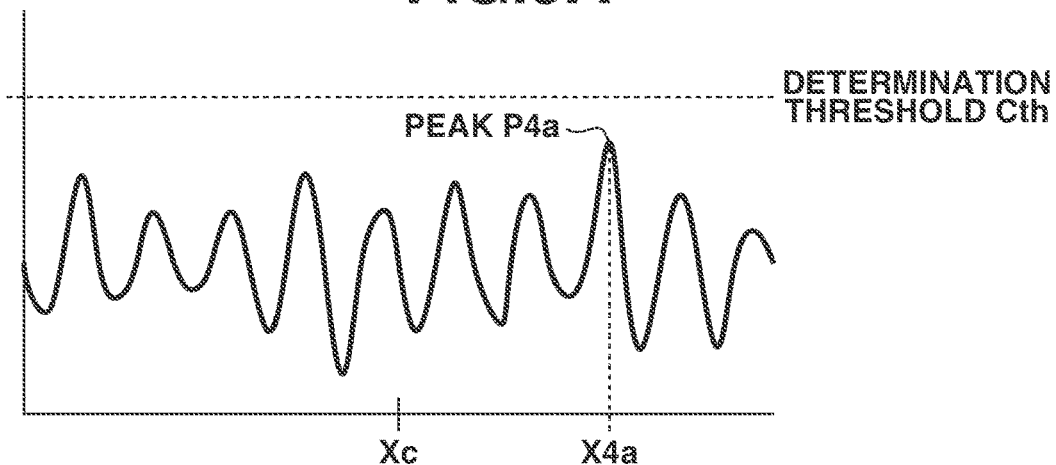
FIGS. 9A to 9C are diagrams each illustrating a cross-correlation function and a determination threshold according to the third exemplary embodiment.

Processing from the start of length measurement to the calculation of the length measurement value in step S108 and the output of the calculated length measurement value in step S109 is similar to that in the first exemplary embodiment. FIG. 9A illustrates the cross-correlation function calculated in step S103.

In step S301, whether to limit the peak search range is determined. A determination threshold Cth is provided for the degree of correlation (the correlation value) of a detected peak. FIG. 9A illustrates the cross-correlation function that is calculated first. Thus, the maximum peak is searched for in the entire range and a peak P4a is detected. However, the degree of correlation of the peak P4a does not exceed the determination threshold Cth. In step S301, it is determined that the condition for limiting the search range is not satisfied (NO in step S301). Thus, the calculation and the setting of the peak search range in step S110 are not performed, and the processing proceeds to the update of the reference image data in step S111. Alternatively, the ratio between the highest peak and the second highest peak may be calculated and compared to a predetermined threshold. If this ratio is greater that the ratio threshold, the condition for limiting the search range is satisfied. Otherwise, the condition is not satisfied.

The degree of correlation in the cross-correlation function indicates that the higher the peak level is, the higher the correlation is. Thus, if the peak level is low, i.e., if the peak level is lower than the determination threshold Cth, the peak may be false. Thus, the peak search range is not limited.

Figure 9B:
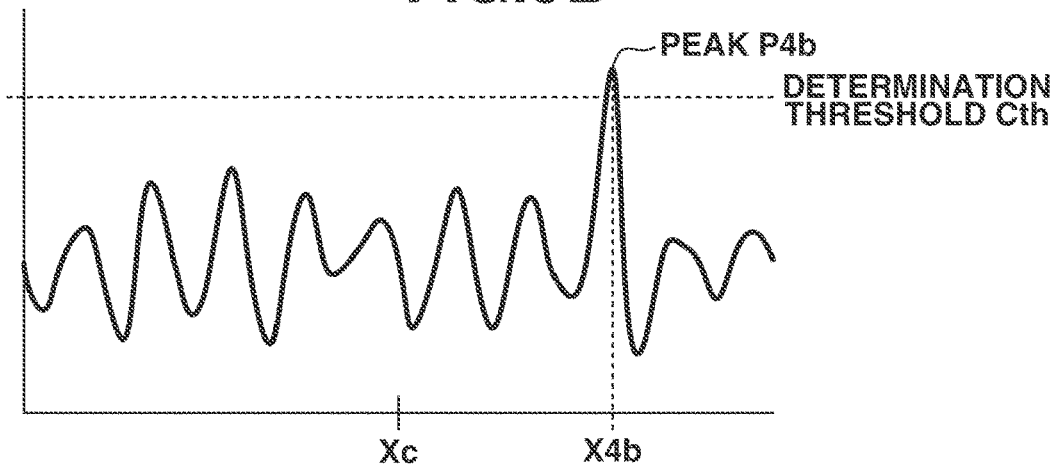

FIG. 9B illustrates the cross-correlation function calculated from the image data that is subsequently acquired. Since the peak search range is not set, a maximum peak is searched for in the entire range based on the determination in step S105. A peak P4b detected at this time exceeds the determination threshold Cth. Thus, based on the determination in step S301, the processing proceeds to the calculation of the peak search range in step S110.

In the calculation of the peak search range in step S110, a search range XL4c-XH4c is calculated using a peak position X4b as a reference, and set in the peak position detection unit 14.

Figure 9C:
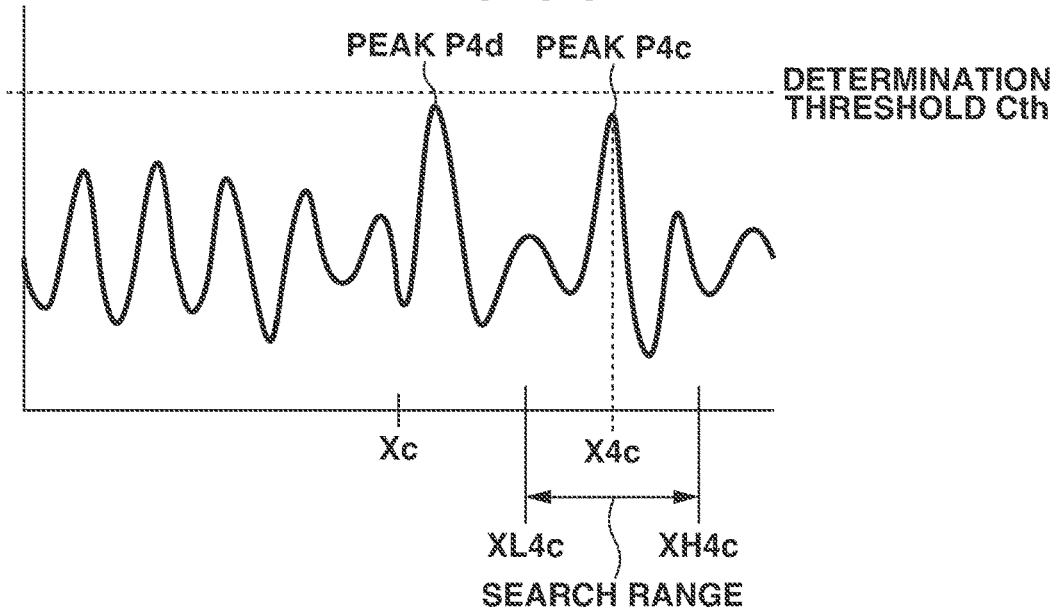

FIG. 9C illustrates the cross-correlation function calculated from the image data that is subsequently acquired. Since the peak search range XL4c-XH4c is set, a peak P4c is detected in the search range XL4c-XH4c. A peak P4d is outside the peak search range and thus is not detected.

The case where whether the peak level of the cross-correlation function exceeds the determination threshold Cth is used as the determination condition for limiting the peak search range has been described above. A case where whether peak positions occur at the same position is used as the determination condition will be described with reference to FIGS. 10A to 10C.

FIG. 10A illustrates the cross-correlation function that is calculated first. Since a peak position is initially searched for, then in step S107, the maximum peak is detected in the entire range, and a peak P5a is detected.

The peak position at this time is X5a. Since the peak position X5a is initially detected, the processing for setting the peak search range in step S110 is not performed.

FIG. 10B illustrates the cross-correlation function calculated from the image data that is acquired next. Since the peak search range is not set at this time, similarly to the initial peak position search, in step S107, the maximum peak is detected in the entire range. The maximum peak detected in the entire range is P5b, and the peak position is X5b.

In step S301, it is determined whether the initially detected peak position X5a and the subsequently detected peak position X5b correspond to the same number of pixels. If the peak positions X5a and X5b are the same, it is determined that the detected peak positions correspond to a true peak, and the processing proceeds to the processing for calculating and setting the peak search range in step S110. Then, a peak search range XL5c-XH5c is calculated using the peak position X5b as a reference, and set in the peak position detection unit 14.

FIG. 10C illustrates the cross-correlation function that is subsequently calculated. In FIG. 10C, since the maximum peak is detected in the peak search range XL5c-XH5c, a peak P5c is detected. A peak P5d is outside the peak search range, and thus is not detected.

As described above, in a case where the positions indicating the plurality of peaks of the cross-correlation functions that are sequentially obtained are the same, the search range can be set. In a case where the peak positions continue to be the same, it is highly likely that the peak positions correspond to a true peak. Thus, whether the peak positions are the same can be used as the condition for determining whether to set the peak search range.

In the present exemplary embodiment, it is determined whether the initially detected peak position X5a and the subsequently detected peak position X5b are the same. However, the peak positions can be exactly the same on condition that the measurement target object is moving at exactly the same speed. For example, when the measurement target object starts moving, the acceleration changes and thus the peaks do not occur at the same position. In addition, since the peak positions are discretely represented, even if the measurement target object is moving at the same speed, the peak position can be ahead of or behind the initially detected peak position depending on the calculation result. Thus, in a case where it is determined whether the peak positions are the same, a range for determining whether the peak positions are the same may be set.

The case where the peak positions successively occur at the same position may not be necessarily used as the condition. Alternatively, the number of times each peak position occurs may be accumulated during a certain period, and the accumulated number of times may be used as the condition for determining whether to set the peak search range.

In the third exemplary embodiment, the processing for setting the peak search range using a true peak position as a reference by providing the condition for limiting the peak search range has been described. This is to avoid the situation where a true peak position cannot be detected in a case where the peak search range is set based on a false peak position.

It is desirable that the peak search range should continue to be set based on a true peak position. However, if a true peak position occurs outside the peak search range for some reason and in a case where the peak search range is limited, it is difficult to detect a true peak position.

Figure 11:
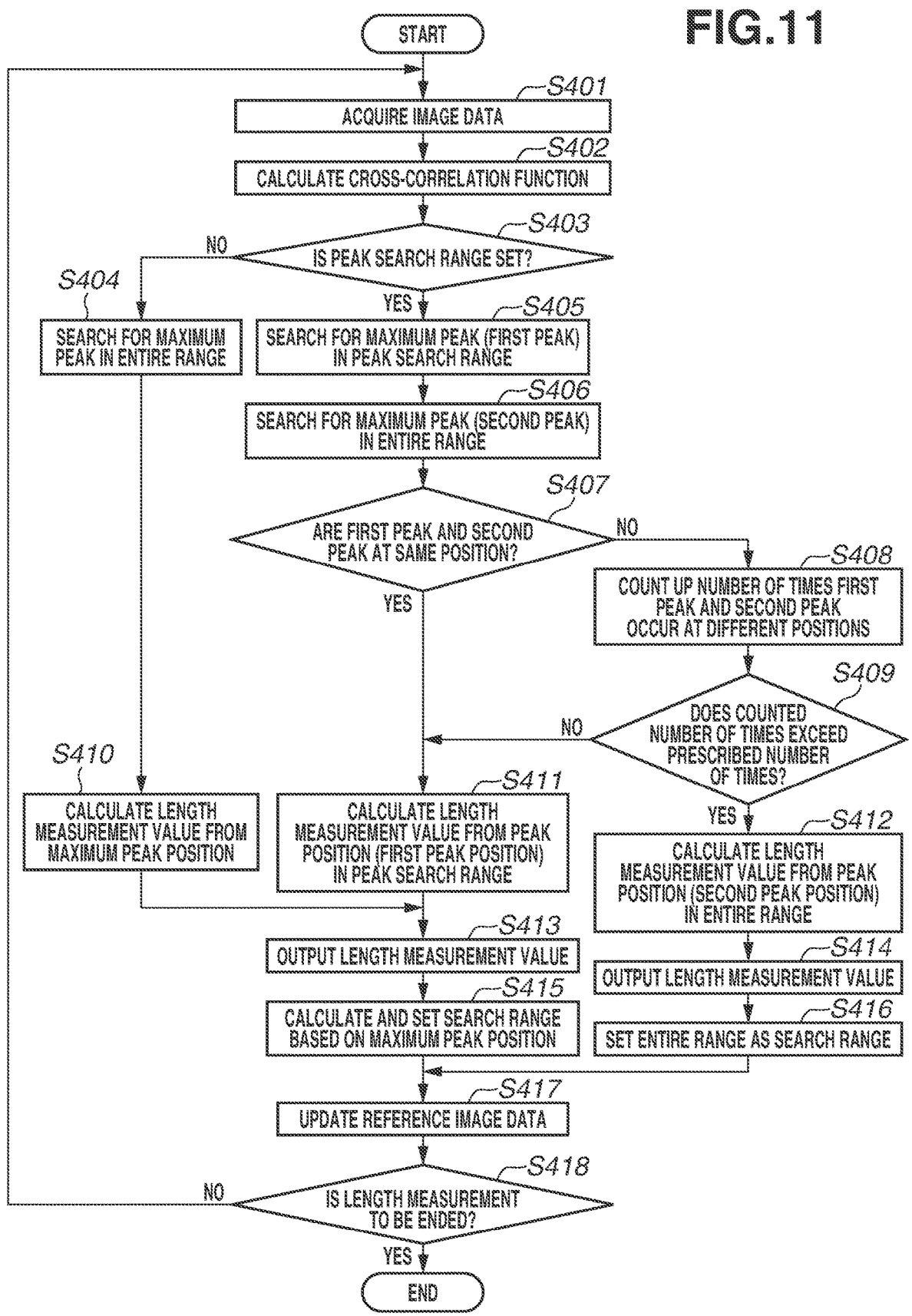
FIG. 11 is a flowchart illustrating a signal processing method according to a fourth exemplary embodiment.

To address this, in a fourth exemplary embodiment, a description will be given of processing in a case where, under the condition that the peak search range is limited, a true peak occurs outside the peak search range, with reference to a flowchart in FIG. 11. In FIG. 11, even for processing similar to that in the first to third exemplary embodiments, all the reference numerals are changed.

In step S401, image data is acquired. In step S402, the cross-correlation function is calculated. Reference image data is set in advance.

In step S403, whether the peak search range is set is determined. In a case where the cross-correlation function is initially calculated, the peak search range is not set (NO in step S403). In step S404, the maximum peak is detected in the entire range. In step S410, the length measurement value is calculated from the peak position. In step S413, the length measurement value is output.

In step S415, the peak search range is set using the detected peak position as a reference. In step S417, the reference image data is updated. The above-described processing for limiting the peak search range is similar to the processing described in the first exemplary embodiment.

The cross-correlation function is calculated from the image data that is acquired next. It is determined in step S403 that the peak search range is set (YES in step S403).

Thus, the processing proceeds to step S405. In step S405, the maximum peak is detected in the peak search range. The peak detected in the peak search range is defined as a first peak. In step S406, the maximum peak is also detected in a range wider than the set search range, such as the entire range. The peak detected in the entire range is defined as a second peak.

After the detection of the first and second peaks is completed, then in step S407, it is determined whether the first peak detected in the peak search range and the second peak detected in the entire range are at the same position. If the first and second peaks are at the same position (YES in step S407), then in step S411, the length measurement value is calculated based on the first peak detected in the peak search range.

If the first and second peaks are not at the same position (NO in step S407), then in step S408, the number of times the first and second peaks occur at different positions is counted up. In step S409, it is determined whether the counted number of times exceeds a prescribed number of times. If the counted number of times does not exceed the prescribed number of times (NO in step S409), the processing proceeds to step S411. In step S411, the length measurement value is calculated based on the first peak detected in the peak search range.

If the number of times the first and second peaks occur at different positions exceeds the prescribed number of times (YES in step S409), it is determined that a true peak occurs outside the peak search range. In step S412, the length measurement value is calculated using the second peak detected in the entire range as a reference. The prescribed number of times for the counted number of times can be set to at least two or more, for example.

In step S414, the calculated length measurement value is output. In step S416, the entire range is set as the peak search range. This is because a true peak position is determined to have moved out of the peak search range and thus the peak search range is widened to detect a true peak again.

With the above-described processing, in a case where a true peak occurs outside the peak search range under some influence, the peak search range can be widened to detect a true peak again.

According to the above-described exemplary embodiments, it is possible to provide a displacement meter capable of, even if the moving speed of a measurement target object is fast, calculating the displacement amount of the measurement target object more accurately.

While the exemplary embodiments of the disclosure have been described above, the disclosure is not limited to these exemplary embodiments, but can be modified and changed in various ways within the scope of the disclosure. The signal processing methods according to the exemplary embodiments can also be combined together. Alternatively, the degree of correlation in the cross-correlation function may be calculated by limiting the calculation range to a part of the entire range of the cross-correlation function, and a peak position may be detected based on the degree of correlation calculated by limiting the calculation range to the partial range. The calculation range to be limited can be determined based on information described in each of the exemplary embodiments, such as the previous peak position. Alternatively, a user interface (UI) capable of changing the search range of a peak position may be provided. For example, on a display connected to the above-described displacement meter, a user inputs a numerical value to an input interface for setting the search range and thereby can change the search range.

Next, a method for manufacturing an article (a metal plate, a pressed product, paper, or fibers) using the above-described displacement meter according to a fifth exemplary embodiment will be described. The article is manufactured through the process of conveying a conveyance object (a target object) using a conveying apparatus, the process of measuring the conveyance amount of the conveyance object as the displacement thereof using the above-described displacement meter, and the process of, at the timing when a desired conveyance amount is detected, performing processing such as cutting or pressing on the conveyance object. Alternatively, the deviation of the conveyance amount from a predetermined value can be detected, and the processing can be stopped.

According to the article manufacturing method, the measurement error of the displacement meter decreases, whereby it is possible to manufacture a higher-quality article than a conventional one.

According to the exemplary embodiments, it is possible to provide a displacement meter capable of, even if the moving speed of a measurement target object is fast, calculating the amount of displacement of the measurement target object more accurately.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-076745, filed Apr. 28, 2021, which is hereby incorporated by reference herein in its entirety.

What is claimed is:

1. A displacement meter configured to measure a displacement of a measurement target object, the displacement meter comprising:
   a light source;
   an illumination assembly configured to illuminate the measurement target object with light from the light source;
   a photoelectric conversion element array configured to detect reflected light from the measurement target object; and
   a calculation circuit configured to calculate an amount of the displacement of the measurement target object by using a cross-correlation function of a plurality of images acquired at different timings by the photoelectric conversion element array,
   wherein the calculation circuit limits a detection range, where the calculation circuit performs processing for detecting a position indicating a peak of the cross-correlation function, to a part of an entire range of the cross-correlation function, detects the position indicating the peak in the limited detection range, and calculates the amount of the displacement based on the detected position indicating the peak, and
   wherein the calculation circuit sets the detection range to include the position indicating the peak of the cross-correlation function, based on the position indicating the peak of the cross-correlation function that is used last time to calculate the amount of the displacement, with respect to the entire range of the cross-correlation function.

2. The displacement meter according to claim 1, wherein the calculation circuit changes the detection range.

3. The displacement meter according to claim 1, wherein the calculation circuit sets the detection range based on information regarding a speed of the measurement target object.

4. The displacement meter according to claim 1, wherein the calculation circuit sets the detection range based on information regarding the amount of the displacement of the measurement target object per sampling period of the photoelectric conversion element array.

5. The displacement meter according to claim 1, wherein the calculation circuit detects a moving direction of the measurement target object, and sets the detection range so that a center of the detection range is on a forward side in the moving direction of the measurement target object with respect to a center of the cross-correlation function.

6. The displacement meter according to claim 1,
   wherein the calculation circuit determines a reference image serving as a reference among the plurality of images acquired by the photoelectric conversion element array, and calculates the cross-correlation function of the reference image and the image acquired by the photoelectric conversion element array after the reference image, and
   wherein the calculation circuit determines the detection range based on a condition for updating the reference image.

7. The displacement meter according to claim 1, wherein the calculation circuit determines whether a value of the peak of the cross-correlation function falls outside a threshold, and in a case where the value of the peak of the cross-correlation function falls outside the threshold, the calculation circuit sets the detection range.

8. The displacement meter according to claim 1, wherein in a case where positions indicating a plurality of peaks of the cross-correlation functions that are sequentially obtained are same, the calculation circuit sets the detection range.

9. The displacement meter according to claim 1, wherein in a case where the position indicating the peak of the cross-correlation function falls outside a threshold, the calculation circuit changes the detection range.

10. The displacement meter according to claim 1,
    wherein the calculation circuit detects a first peak of the cross-correlation function in the limited detection range, and detects a second peak of the cross-correlation function in a range wider than the limited detection range,
    wherein the calculation circuit compares a first position indicating the first peak detected in the limited detection range, and a second position indicating the second peak detected in the range wider than the limited detection range,
    wherein the calculation circuit counts a number of times the first position and the second position occur at different positions, and
    wherein in a case where the counted number of times reaches at least twice, the calculation circuit sets the range wider than the limited detection range as the detection range.

11. A method for manufacturing an article, the method comprising:
    measuring an amount of displacement of a target object by using the displacement meter according to claim 1; and
    processing the target object based on the measured amount of displacement.

* * * * *